Figure 1:
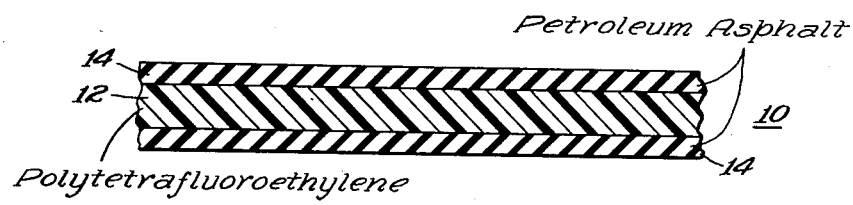

Dec. 12, 1950

W. W. PENDLETON ET AL 2,533,501

ELECTRICAL INSULATION COMPRISING
POLYTETRAFLUOROETHYLENE
Filed March 24, 1948

WITNESSES:
Robert A. Baird
Robert E. Ross

INVENTORS
Wesley W. Pendleton and
Harold M. Philofsky.
BY
Frederick Shapoe
ATTORNEY Patented Dec. 12, 1950

2,533,501

UNITED STATES PATENT OFFICE 2,533,501

ELECTRICAL INSULATION COMPRISING POLYTETRAFLUOROETHYLENE

Wesley W. Pendleton and Harold M. Philofsky, Pittsburgh, Pa., assignors to Westinghouse Electric Corporation, East Pittsburgh, Pa., a corporation of Pennsylvania Application March 24, 1948, Serial No. 16,704

4 Claims. (Cl. 174—120)

This invention relates generally to electrical insulation, and more particularly to a composite insulating tape for conductors and coils of dynamo-electric machines.

In applying an insulating tape made of polytetrafluoroethylene on insulating electrical conductors and coils of dynamo-electric machines, it has not been found satisfactory for high voltage insulation in spite of its desirable electrical properties, such as high dielectric strength and low power factor. When a conductor insulated with spirally wrapped polytetrafluoroethylene tape is subjected to high voltages of the order of 20 kv. failure of the insulation occurs after a few weeks service. This failure is attributed to certain electrical phenomena developed within small air spaces, or voids, which are unavoidably present in wrapping the tape. These voids have been found to be present in polytetrafluoroethylene tape insulation even when the tape is wound as carefully and as tightly as possible about the conductor.

The electrical potential produced within the air spaces in the insulation eventually causes the insulation to fail, either by reason of the chemical action of nitrogen oxides produced by the corona, or by the bombardment of the insulation by high speed electrons produced by the electrical potential.

In employing types of insulating tape other than polytetrafluoroethylene, the formation of corona is prevented by impregnating the tape with varnish or other resinous material either prior to or after winding it on the conductor, and subjecting the conductor with the spirally wound tape to heat and pressure to cure the resin and bond the tape together, thereby eliminating any air spaces in which corona may occur.

However, polytetrafluoroethylene tape cannot be impregnated, nor can the resin be applied to the tape as an adherent surface coating, since resins commonly used for impregnating the insulation of electrical machines will not adhere to the surface of the polytetrafluoroethylene. This makes it impossible to utilize previously prepared resin coated polytetrafluoroethylene tape for insulating conductors, since the resin coating will separate from the tape and peel off. Nor is satisfactory insulation obtained by applying the resin to the tape during the winding of the tape around the conductor, since the subsequent curing operation and the handling necessary to fit the conductor into position in a dynamo-electric machine will cause the resin to separate from the polytetrafluoroethylene tape leaving minute spaces between the resin and the tape.

The object of this invention is to provide a polytetrafluoroethylene insulating tape having an adherent coating thereon which prevents the occurrence of voids when the tape is wound on a conductor.

A further object of the invention is to provide a relatively corona free tape insulation on electrical conductors, the insulation being formed of a plurality of layers of spirally wound polytetrafluoroethylene tape having an adherent coating of petroleum asphalt applied thereto.

A further object of the invention is to provide a method for applying a polytetrafluoroethylene tape insulation to an electrical conductor, whereby the occurrence of voids in the insulation is prevented.

Figure 2:
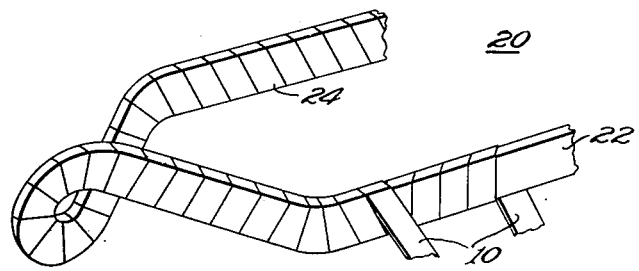

For a fuller understanding of the nature and objects of the invention, reference should be had to the following description taken in conjunction with the accompanying drawing, in which:

Figure 1 is a cross-sectional view of a composite tape embodying the features of the invention; and Fig. 2 is a fragmentary perspective view of an insulated coil for a dynamo-electric machine embodying the features of the invention.

Of a great number of natural and synthetic resins tested, none have been found capable of adhering to polytetrafluoroethylene except petroleum asphalt. In accordance with this invention, polytetrafluoroethylene tape is provided with an adherent coating of petroleum asphalt to make a composite insulating tape relatively free from corona at voltages above 6900, and having exceptional electrical and mechanical properties. In practicing the invention, polytetrafluoroethylene in tape or sheet or other form is coated with petroleum asphalt having an American Society for Testing Materials ball and ring softening point of between 50° C. and 130° C. The asphalt coating so produced adheres to the surface of the polytetrafluoroethylene tape, and the resulting composite tape is capable of being wound about the electrical conductors to provide adherent insulation which is free of air spaces and in which corona does not occur when high voltages are applied to the conductor.

Referring to Fig. 1, there is illustrated a composite tape 10, formed of a base layer 12 of polytetrafluoroethylene, and an adherent coating 14 of petroleum asphalt. The polytetrafluoroethylene layer 12 may be of any suitable thickness, but it is most convenient to use tape having a thickness of between about 5 and 10 mils. The thickness of the asphalt coating 14 may be varied to suit requirements.

It is preferred that the petroleum asphalt of coating 14 have a A. S. T. M. ball and ring softening point of between 50° C. and 130° C. The softening point of the asphalt used will be determined by the temperature which the insulation is required to withstand, since the softening point of the asphalt should be above the operating temperature of the conductor. The lower-softening-point asphalts adhere more readily to the polytetrafluoroethylene tape surface, consequently, for most electrical uses it is preferred to use an asphalt whose softening point is between 90° C. and 110° C.

The petroleum asphalt may embody small amounts, up to 10% by weight, of other compatible resins, such as polyethylene, or solid fillers such as iron oxide, silica or mica dust. In applying the asphalt to the polytetrafluoroethylene tape, the tape is passed through a bath of the asphalt while maintaining the asphalt at a temperature of between 150° C. and 200° C. The exact temperature of the asphalt bath will depend on the softening point of the asphalt used, and it need be only hot enough to render it fluid and of such low viscosity that a thin film is applied to the tape. Higher temperatures are used with the asphalts having softening points near or at 130° C. It has been found that thin coatings with good adherence of the asphalt to the tape may be applied when the asphalt bath is maintained at a temperature such that its viscosity is about 1 poise.

Referring to Fig. 2 there is illustrated a coil 20, for use in a dynamo-electric machine. The coil 20 comprises an electrical conductor 22, having insulation 24 applied thereto. The insulation 24 is composed of a plurality of layers of polytetrafluoroethylene tape 10, having an adherent coating of petroleum asphalt applied thereto. The tape 10 is applied to the conductor 22 by spirally winding the tape about the conductor, while the asphalt coating is in a tacky condition.

For some insulating applications it may be desirable to apply the asphalt coating to the polytetrafluoroethylene tape or sheet during the tape winding operation, either by allowing a stream of asphalt to flow over the conductor as the tape is being wrapped thereon, or by passing the tape through a bath of asphalt and immediately winding the coated tape on the conductor while the coating is still tacky.

If desired, a supply of tape may be coated with asphalt, the asphalt allowed to cool after which the tape may be wound into rolls and stored for future use. In this case, when the tape is used, it should be heated to render the asphalt tacky and flowable just before it is applied to the conductor 22 as to insure proper bonding of the various layers of tape and the filling of any spaces in the insulation by flow of the asphalt to conform with the conductor and the tape proper.

The asphalt bonds to the conductor and thereby no air spaces exist in the applied insulation, nor does separation of the applied composite polytetrafluoroethylene-asphalt insulation and conductor occur in ordinary handling and use of the insulated conductor. This maintains a solid, voidless insulation.

Tests on conductors insulation in accordance with the teachings of this invention have shown that greatly superior electrical insulation can be obtained with asphalt-coated polytetrafluoroethylene tape than with polytetrafluoroethylene tape insulation alone.

In comparative tests a ⅝" brass conductor was spirally wrapped with fourteen layers of polytetrafluoroethylene tape having a width of 1½" and a thickness of about 5 mils. A potential of 18,000 volts was applied to the conductor, and maintained until the insulation failed at the end of about 21 days.

Microscopic inspection of the tape after failure revealed the presence of many minute perforations where the tape was lapped on itself in winding. It is believed that these perforations were caused by high speed electrons bombarding the tape at these points, where, by reason of the air spaces, the electrons can gain sufficient speed to penetrate the tape.

A similar test member was prepared with a ⅝" brass conductor spirally wound with seven layers of polytetrafluoroethylene tape which had been coated with asphalt having a ball and ring softening point of 93° C. A potential of 18,000 volts was applied to the conductor, and the voltage was maintained for about 180 days, without failure of the insulation and without any observable deterioration thereof.

In another embodiment of the invention, the conductor may be wrapped initially with several layers of polytetrafluoroethylene tape in combination with a petroleum asphalt having a relatively low softening point, and a final outer layer of tape having an asphalt coating with a high softening point may then be applied. A conductor having this type of insulation may be safely subjected to temperatures up to the softening point of the asphalt in the outer layer.

It will be understood that solid polytetrafluoroethylene in any form may be applied to members in combination with petroleum asphalt to bond thereto and to fill spaces between the solid polytetrafluoroethylene and the member to which it is applied. Thus, extruded tubes of polytetrafluoroethylene may be applied to wire with an intervening bonding layer of asphalt.

Since certain obvious changes may be made in the above procedures and different embodiments of the invention may be made without departing from the scope thereof, it is intended that all matter contained herein shall be interpreted as illustrative and not in a limiting sense.

We claim as our invention:

1. An insulated electrical conductor comprising in combination, an electrical conductor and insulation applied thereto, the insulation comprising solid polytetrafluoroethylene and petroleum asphalt applied thereto, the asphalt being applied between the conductor and the solid polytetrafluoroethylene to provide solid voidless insulation and to bond to the polytetrafluoroethylene, the petroleum asphalt having a ball and ring softening point of between 50° C. and 130° C.

2. An insulated electrical conductor comprising, in combination, a metallic conductor and insulation applied thereto, the insulation comprising a plurality of layers of spirally wound polytetrafluoroethylene tape having an adhesive coating of petroleum asphalt applied thereto to prevent voids in the applied insulation and to bind the layers together and to the conductor, the asphalt having a ball and ring softening point of between 50° C. and 130° C.

3. An electrical insulating tape comprising a base layer of polytetrafluoroethylene and an adherent coating of petroleum asphalt applied thereto, the petroleum asphalt having a ball and ring softening point of between 50° C. and 130° C.

4. The method of insulating an electrical conductor which comprises the steps of passing a tape of polytetrafluoroethylene through a bath of petroleum asphalt having a ball and ring softening point of between 50° C. and 130° C., the bath being maintained at a temperature of between 150° C. and 200° C. to provide an adherent layer of asphalt on the tape, and winding a plurality of layers of the tape carrying the adhesive layer of asphalt on the electrical conductor while the asphalt is still tacky to insulate the conductor, the asphalt serving to bond the layers of tape together and to the conductor, to prevent void spaces therebetween.

WESLEY W. PENDLETON.
HAROLD M. PHILOFSKY

REFERENCES CITED

The following references are of record in the file of this patent:

UNITED STATES PATENTS

| Number | Name | Date |
|---|---|---|
| 1,503,337 | Seigle | July 29, 1924 |
| 1,817,108 | Steerup | Aug 4, 1931 |
| 1,893,599 | Seymour | Jan. 10, 1933 |
| 2,043,110 | McLaurin | June 2, 1936 |
| 2,412,851 | Weiseman | Dec. 17, 1946 |